(12) United States Patent
Mihailov et al.

(10) Patent No.: US 7,483,615 B2
(45) Date of Patent: Jan. 27, 2009

(54) METHOD OF CHANGING THE REFRACTIVE INDEX IN A REGION OF A CORE OF A PHOTONIC CRYSTAL FIBER USING A LASER

(75) Inventors: Stephen J. Mihailov, Kanata (CA); Dan Grobnic, Ottawa (CA); Huimin Ding, Nepean (CA); Robert B. Walker, Spencerville (CA); Christopher W. Smelser, Ottawa (CA); Ping Lu, Ottawa (CA); Xiaoli Dai, Ottawa (CA); Gino Cuglietta, Kanata (CA)

(73) Assignee: Her Majesty the Queen in Right of Canada as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 18 days.

(21) Appl. No.: 11/678,844

(22) Filed: Feb. 26, 2007

(65) Prior Publication Data
US 2007/0201802 A1 Aug. 30, 2007

Related U.S. Application Data

(60) Provisional application No. 60/777,061, filed on Feb. 27, 2006.

(51) Int. Cl.
*G02B 6/032* (2006.01)
(52) U.S. Cl. .................................................. 385/125
(58) Field of Classification Search ....................... None
See application file for complete search history.

(56) References Cited

U.S. PATENT DOCUMENTS

| | | | |
|---|---|---|---|
| 4,807,950 A | 2/1989 | Glenn et al. | 385/123 |
| 5,367,588 A | 11/1994 | Hill et al. | 430/5 |
| 7,062,140 B2 | 6/2006 | Bjarklev et al. | 385/125 |
| 2006/0182400 A1* | 8/2006 | Furuya et al. | 385/129 |
| 2007/0079750 A1* | 4/2007 | Miguez et al. | 117/68 |

OTHER PUBLICATIONS

T.A. Birks, P.J. Roberts, P.St.J. Russell, D.M. Atkin ,and T.J. Shepherd, "Full 2-D photonic bandgaps in silica/air structures" Electronics Letters vol. 31 No. 22 p. 1941-1943. Oct. 26, 1995.

T. A. Birks, J. C. Knight, and P. St. J. Russell "Endlessly single-mode photonic crystal fiber", Optics Letters vol. 22, No. 13 p. 961-963 Jul. 1, 1997.
B. J. Eggleton, P. S. Westbrook, R. S. Windeler, S. Spalter, and T. A. Strasser, "Grating resonances in air-silica microstructured optical fiber," Opt. Lett., vol. 24, No. 21, pp. 1460-1462, 1999.
P. Russell, "Photonic Crystal Fibers," Sci., vol. 299, pp. 358-362, 2003.
N. Groothoff, J. Canning, E. Buckley, K. Lyttikainen, and J. Zagari, "Bragg gratings in air silica structured fibers," Opt. Lett., vol. 28, No. 4, pp. 233-235, 2003.
E. C. Mägi, P. Steinvurzel, and B. J. Eggleton "Transverse Characterization of Tapered Photonic Crystal Fibers", Journal of Applied Physics vol. 96 No. 7, Oct. 1, 2004.
S. J. Mihailov, C. W. Smelser, D. Grobnic, R. B. Walker, P. Lu, H. Ding, and J. Unruh, "Bragg Gratings Written in All-$SiO_2$ and Ge-Doped Core Fibers With 800-nm Femtosecond Radiation and a Phase Mask," J. Lightwave Technol., vol. 22, No. 1, pp. 94-100, 2004.
C. W. Smelser, D. Grobnic, and S. J. Mihailov, "Generation of pure two-beam interference grating structures in an optical fiber with a femtosecond infrared source and a phase mask," Opt. Lett., vol. 29, No. 15, pp. 1730-1732, 2004.
E. C. Mägi, P. Steinverzel, and B. J. Eggleton, "Tapered photonic crystal fibers," Opt. Express, vol. 12, No. 5, pp. 776-784, 2004.
L. B. Fu, G. D. Marshall, J. A. Bolger, P. Steinvurzel, E. C. Mägi, M. J. Withford, and B. J. Eggleton, "Femtosecond laser writing Bragg gratings in pure silica photonic crystal fibers," Electron. Lett., vol. 41, No. 11, pp. 638-640, 2005.
E. C. Mägi, H. C. Nguyen, and B. J. Eggleton, "Air-hole collapse and mode transitions in microstructured fiber photonic wire," Opt. Express, vol. 13, No. 2, pp. 453-459, 2005.
D. Grobnic, S. J. Mihailov, H. Ding, and C. W. Smelser, "Bragg Grating Evanescent Field Sensor Made in Biconical Tapered Fiber With Femtosecond IR Radiation," IEEE Photon. Technol. Lett., , vol. 18, No. 1, pp. 160-162, 2006.
Stephen J. Mihailov, Member, IEEE, Dan Grobnic, Huimin Ding, Christopher W. Smelser, and Jes Broeng, "Femtosecond IR Laser Fabrication of Bragg Gratings in Photonic Crystal Fibers and Tap" IEEE Photonics Technology Letters, vol. 18, No. 17, Sep. 1, 2006.

* cited by examiner

*Primary Examiner*—Sung H Pak
(74) *Attorney, Agent, or Firm*—Teitelbaum & MacLean; Neil Teitelbaum; Doug MacLean

(57) ABSTRACT

Fiber Bragg gratings were written in pure silica photonic crystal fibers and photonic crystal fiber tapers with 125 fs, 800 nm IR radiation. High reflectivites were achieved with short exposure times in the tapers. Both multimode and single mode grating reflections were achieved in the fiber tapers. By tapering the photonic crystal fibers scattering that would otherwise have occurred was lessened and light external to the fiber could reach the core effectively to write a grating.

13 Claims, 3 Drawing Sheets

METHOD OF CHANGING THE REFRACTIVE INDEX IN A REGION OF A CORE OF A PHOTONIC CRYSTAL FIBER USING A LASER

CROSS-REFERENCE TO RELATED APPLICATIONS

The present invention claims priority from U.S. Provisional Patent Application No. 60/777,061 filed Feb. 27, 2006, entitled "Method of producing a Bragg Grating in photonics crystal fiber Using an Ultrafast Laser", which is incorporated herein by reference for all purposes.

FIELD OF THE INVENTION

This invention relates generally to the direct writing of gratings in photonic crystal structures such as microstructured optical fiber and photonic crystal waveguides using a diffraction grating and femtosecond pulsed light; and, one aspect of this invention relates to the modification of microstructured optical fiber or waveguides to facilitate the inscription of gratings therein.

BACKGROUND OF THE INVENTION

Optical fibers are used in many fields including telecommunications, laser machining and welding, laser beam and power delivery, fiber lasers, sensors and medical diagnostics and surgery. They are typically made entirely from solid transparent materials such as glass and each fiber typically has the same cross-sectional structure along its length. The transparent material in one part (usually the middle) of the cross-section has a higher refractive index than the rest and forms an optical core within which light is guided by total internal reflection. We refer to such a fiber as a standard fiber.

Although the light is confined to the core in a standard fiber, the cladding plays an active part in the wave-guiding process because a guided mode will extend some distance into the cladding. The cladding is also important for a relatively new class of fiber devices, know as cladding-pumped fiber lasers and amplifiers. The fibers used in such devices have an inner core, in which signal light propagates as a single-mode, and which is doped with some active material, typically a rare earth element. The inner core is nested in a larger outer core, which is multimode at both signal and pump wavelengths. Typically, the inner core is nested off-center within the outer core, to improve the overlap between the core mode and the modes of the cladding. High-power multi-mode pump light can be introduced into the outer core with a high efficiency, and propagates down the fiber, being gradually absorbed by the rare earth element present in the inner core. The signal in the inner core is then amplified, forming an optical amplifier or, with appropriate feedback, a laser.

Evanescent fiber sensors and couplers based on standard fibers are known in the form of "D" fibers. The preform from which a "D" fiber is drawn is polished away on one side until the core is close to the surface of the fiber. The fiber is then drawn and the thin layer of cladding glass remaining adjacent to the core in the previously polished region is etched away over a short length of fiber. The evanescent field of light propagating in the fiber is thus readily accessible only over that short length.

In the last few years, a non-standard type of optical fiber has been demonstrated, called the photonic-crystal fiber (PCF). Typically, this is made from a single solid, and substantially transparent, material within which is embedded a periodic array of air holes, running parallel to the fiber axis and extending longitudinally, the full length of the fiber. A defect in the form of a single missing air hole within the regular array forms a region of raised refractive index within which light is guided, in a manner analogous to total-internal-reflection guiding in standard fibers. The effective refractive index of each region of the fiber may be calculated using the methods outlined in, for example, Birks et al, Opt. Lett 22 961 (1997). Another mechanism for guiding light is based on photonic-band-gap effects rather than total internal reflection. Photonic-band-gap guidance can be obtained by suitable design of the array of air holes (see, for example, Birks et al, Electron. Lett. 31 1941 (1995)). Light with particular propagation constants can be confined to the core and will propagate therein.

Photonic-crystal fiber can be fabricated by stacking, on a macroscopic scale, glass canes—some of which are capillaries—into the required shape and then holding them in place while fusing them together and drawing them down into a fiber. PCF has unusual properties such as the ability to guide light in a single-mode over a very broad range of wavelengths, and to guide light having a relatively large mode area which remains single-mode.

This invention relates to the writing of Bragg gratings in the core of PCF and the overcoming of difficulties that have been associated therewith.

The fabrication of many photonic devices has been achieved through exposure of transmissive and absorbing materials to intense laser radiation in order to change the optical properties of said materials. For example, UV-induced photo-sensitivity of germanium doped silica glasses has been exploited in order to create permanent refractive index changes in the photosensitive Ge-doped silica cores of single mode optical fibers and waveguides as opposed to the undoped cladding. By creating a spatial intensity modulation of the UV exposure either by using a two-beam interference technique as disclosed in U.S. Pat. No. 4,807,950 by Glenn et al. or by using a phase mask as disclosed in U.S. Pat. No. 5,367,588 by Hill et al., Bragg grating structures can be produced in the photosensitive core of the waveguide.

Bragg gratings in optical fiber and waveguides have developed into an important technology for wavelength division multiplexing (WDM) systems and other applications for fiber optic systems such as optical sensing because of the highly desirable optical characteristics the Bragg structures exhibit as well as the relative ease with which they can be fabricated. A large variety of optical devices have been fabricated using Bragg gratings in waveguides including optical add/drop multiplexing filters (OADM), gain flattening filters, band splitters and dispersion compensators.

Photonic crystal fibers (PCFs) or microstructured fibers, as described above, consisting of a periodic array of air holes that make up a cladding region about a solid core, represent a new class of waveguides with unique modal, dispersive and nonlinear properties that have found applications in a variety of optical fields. The coupling of these two technologies, by the fabrication of grating structures within PCFs, has received much attention recently because of the potential advantages of exploiting together the distinct strengths of each technology.

Gratings fabricated in PCF with a Ge-doped core using existing FBG fabrication techniques are described by B. J. Eggleton et al. in "Grating resonances in air-silica microstructured optical fiber," Opt. Lett. 24, 1460 (1999). Modest strength gratings have also been made in standard all-silica PCF using phase masks and an ArF excimer and UV femtosecond pulse duration laser radiation.

Although these prior art Bragg gratings in photonic crystal fiber provide a useful function, they are known to suffer from some limitations in terms of the strength of the grating resonance that can be produced. In fact only modest refractive index modulations have been reported, i.e., $\sim 1\times 10^{-4}$ and in the case of photonic crystal fiber consisting of pure silica, the grating writing times in this PCF were prohibitively long; over 1 hour when high photonic energy Argon Fluoride UV excimer laser radiation or high intensity femtosecond UV radiation is used.

Unfortunately, with side exposure inscription of Bragg gratings in PCF, scattering of light by the cladding holes is deleterious, especially when the exposure wavelength is on the same order as the hole dimensions and hole spacing or pitch that make up the photonic crystal cladding region, or more precisely the exposure wavelength is resonant with the photonic band gap created by the hole dimensions and spacing. The resulting intensity of energy incident on the core region is greatly reduced. PCFs have been characterized and the band gaps for particular PCFs have been determined. E. C Magi et al. in a paper entitled Transverse Characterization of Tapered Photonic Crystal Fibers, Journal of Applied Physics Vol 96 No. 7, 1 Oct. 2004, disclose the characterization of PCF as a function of a taper diameter, and rotational orientation of the photonic crystal lattice of the taper with respect to the incident probe beam, however there is no suggestion of writing a structure in such a fiber as a function of a mismatch between the irradiating wavelength and the band gap of the PCF.

As a solution to this problem we have discovered that this effect can be mitigated by either using a fiber geometry with fewer intervening holes between the core and outer surface or by removing or effectively removing the holes altogether. We have further discovered that by tapering a photonic crystal fiber sufficiently, scattering of light that otherwise would have occurred when writing a grating into the PCF using IR light can be lessened or effectively eliminated so that a high contrast grating can be written into the PCF. The hole diameter and hole spacing is reduced however in the absence of hole collapse; the ratio of hole diameter to hole spacing is constant. The change in hole diameter and spacing shifts the photonic band gap generated by the cladding holes away from the exposure wavelength. Effectively removing the holes for the purpose of writing a grating in the core, can also be achieved by using an index matching fluid placed into the holes or voids in PCF so that the scattering effect can be substantially minimized. Alternatively, actual removal of the holes can be done by completely collapsing the holes by sufficiently tapering the PCF. Yet, an alternative and less preferred solution to the problem of scattering of incident radiation through the crystal cladding region, is to manufacture PCF that has hole dimensions and hole spacing or pitch that is not on the same order as the exposure wavelength, or more precisely with hole dimensions and pitch that do not produce a photonic band gap at the exposure wavelength. Stated differently, one using IR or UV light to irradiate a PCF should preferably select the PCF with hole spacing and pitch to produce a photonic band gap to be a significantly different from the exposure wavelength so as to sufficiently lessen unwanted scattering. Selection of such a hole diameter and pitch may not always be possible depending on the mode propagation requirements of the PCF.

It is an object of this invention to overcome the aforementioned limitations within the prior art systems for fabrication of Bragg gratings in photonics crystal optical fiber and waveguides by substantially lessening or effectively removing the scattering effects of cladding holes in photonic crystal optical fiber and waveguides allowing for the induction of large refractive index change in said photonic crystal optical fibers and waveguides using laser radiation.

It is a further object of this invention to provide a method of lessening the scattering effect of the incident radiation used for writing a grating in the core region of a photonic crystal optical fiber by changing an aspect of the PCF's response to the light by: injection of index matching fluid into the cladding holes of the photonic crystal fiber which is transmissive to the radiation but is index matched to the photonic crystal fiber material (typically silica); or by tapering the PCF suitably so as to narrow a portion of the fiber prior to irradiating the fiber with light so as to write a grating therein.

SUMMARY OF THE INVENTION

In accordance with this invention a method of writing a grating in a photonic crystal waveguide is provided comprising the steps of:

providing a PCF having a cladding surrounding a core;

b) changing an aspect of the PCF's response to incident light, so as to lessen unwanted scattering that would otherwise occur in the absence of changing said aspect when irradiating the PCF with the irradiation;

and irradiating the PCF from a side with laser light having an intensity I, wavelength and suitable duration so as to effect a refractive index change within the PCF of at least $1\times 10^{-5}$ wherein at least $(0.1)$I of the light is transmitted through the cladding to reach the core, wherein I is greater than $10^2$ W/cm$^2$ and less than $5\times 10^{13}$ W/cm$^2$ for a silica based PCF. To inscribe a grating in hydrogen loaded standard fiber with continuous wave 244 nm (UV), an intensity of $\sim 300$ W/cm$^2$ is required. This represents the lower intensity limit. To inscribe a grating with ultrafast IR without damaging SMF fiber, the peak intensity is $\sim 5\times 10^{13}$ W/cm$^2$)

This invention provides a structure for allowing incident IR femtosecond radiation to reach the core area of a photonic crystal optical fiber, which would otherwise normally be scattered by holes that make up the cladding region of the photonic crystal fiber. If the incident IR radiation is modulated by a phase mask or is tightly focused then a Bragg grating could be written. This invention also provides a different structure which would allow for increase UV radiation to reach the core area. This can also apply to an instance where the PCF core is germanium doped and CW UV lasers are used for the inscription. Hydrogen loaded germanium doped PCF may have end thereof fused so the hydrogen does not easily escape, prior to inscribing a grating.

In accordance with an embodiment of this invention, a method for inducing a spatially modulated refractive index pattern in a photonic crystal optical fiber or waveguide is provided, comprising the steps of:

providing the photonic crystal optical fiber or waveguide;

tapering the photonic crystal fiber such that the photonic band gap formed by the presence of the cladding holes is at least 10% transmissive to electromagnetic radiation having a predetermined wavelength range such that at least 10% of the electromagnetic radiation can reach the core;

disposing a mask to be used as an interferometer, adjacent the photonic crystal optical fiber or waveguide such that light incident upon the mask is transmitted directly into said optical fiber or waveguide; and, providing electromagnetic radiation on a surface of the mask, the electromagnetic radiation having a predetermined wavelength range and having a pulse duration of less than or equal to 500 picoseconds, wherein the mask is disposed to permit a portion of the electromagnetic radiation to interact with the mask and be incident on the photonic crystal optical fiber or waveguide, the interaction of the electromagnetic radiation with the mask for producing a spatial intensity modulation pattern within the photonic crystal optical fiber or waveguide, the electromagnetic radiation incident on the photonic crystal optical fiber or waveguide being sufficiently intense to cause a change in an index of refraction of the photonic crystal optical fiber or waveguide, wherein electromagnetic radiation interacting with the surface of the mask having a sufficiently low intensity to not significantly alter produced spatial intensity modulation properties of the mask.

In accordance with another aspect of the invention, there is provided a method of inducing a spatially modulated refractive index pattern in a photonic crystal optical fiber or waveguide, comprising the steps of:

providing the photonic crystal optical fiber or waveguide;

tapering the photonic crystal fiber adiabatically such that the photonic crystal optical fiber or waveguide propagates in single mode electromagnetic radiation having a predetermined wavelength range and collapsing the holes in the tapered region of said photonic crystal optical fiber or waveguide such that light propagating in the collapsed region fills the collapsed region cross-section;

wherein the collapsed region is transmissive to electromagnetic radiation having a predetermined wavelength range (used to induce the index change)

disposing a mask to be used as an interferometer, adjacent the photonic crystal optical fiber or waveguide such that light incident upon the mask is transmitted directly into said optical fiber or waveguide; and, providing electromagnetic radiation on a surface of the mask, the electromagnetic radiation having a predetermined wavelength range and having a pulse duration of less than or equal to 500 picoseconds, wherein the mask is disposed to permit a portion of the electromagnetic radiation to interact with the mask and be incident on the photonic crystal optical fiber or waveguide, the interaction of the electromagnetic radiation with the mask for producing a spatial intensity modulation pattern within the photonic crystal optical fiber or waveguide, the electromagnetic radiation incident on the photonic crystal optical fiber or waveguide being sufficiently intense to cause a change in an index of refraction of the photonic crystal optical fiber or waveguide, wherein electromagnetic radiation interacting with the surface of the mask having a sufficiently low intensity to not significantly alter produced spatial intensity modulation properties of the mask.

In accordance with another aspect of the invention, there is provided a method for inducing a spatially modulated refractive index pattern in a photonic crystal optical fiber or waveguide, comprising the steps of:

providing the photonic crystal optical fiber or waveguide;

providing a fluid into the cladding holes of the photonic crystal fiber or waveguide that is substantially index matched to the refractive index of the photonic crystal fiber or waveguide substrate material such that the holes having the refractive index matched fluid is transmissive to electromagnetic radiation having a predetermined wavelength range;

disposing a mask to be used as an interferometer, adjacent the photonic crystal optical fiber or waveguide such that light incident upon the mask is transmitted directly into said optical fiber or waveguide; and, providing electromagnetic radiation on a surface of the mask, the electromagnetic radiation having a predetermined wavelength range and having a pulse duration of less than or equal to 500 picoseconds, wherein the mask is disposed to permit a portion of the electromagnetic radiation to interact with the mask and be incident on the photonic crystal optical fiber or waveguide, the interaction of the electromagnetic radiation with the mask for producing a spatial intensity modulation pattern within the photonic crystal optical fiber or waveguide, the electromagnetic radiation incident on the photonic crystal optical fiber or waveguide being sufficiently intense to cause a change in an index of refraction of the photonic crystal optical fiber or waveguide, wherein electromagnetic radiation interacting with the surface of the mask having a sufficiently low intensity to not significantly alter produced spatial intensity modulation properties of the mask.

In accordance with a broad aspect of this invention a method of writing a structure such as a grating in a photonic crystal fiber (PCF) is provided wherein methods of displacing the spectral position of the PCF bandgap away from the laser wavelength so as to ensure a level of the transmissivity of the laser radiation through the PCF sufficient to result in an index change of at least $1 \times 10^{-5}$ in the core in the refractive index of the fiber core. Thus one must consider the laser wavelength and spectral position of the PCF bandgap to ensure that they differ sufficiently so as to allow enough of the laser energy to reach core of the PCF. This invention is concerned with mitigating scattering that would otherwise occur between the outer surface of the PCF and through the cladding region.

In one embodiment of this invention PCF can be designed and manufactured such that its holes size and pitch does not produce a band gap for transverse radiation for example at the IR at wavelengths about 800 nm. Thus if the wavelength of irradiating light and PCF structure are purposely used together and dissimilar enough such that the band gap of the PCF is not in the order of the wavelength the problem of scattering effects will be mitigated or will be negligible.

BRIEF DESCRIPTION OF THE DRAWINGS

Exemplary embodiments of the invention will now be described in conjunction with the drawings in which:

FIG. 1a photograph in the form of a cross-sectional view of a first PCF.

FIG. 1b is a cross-sectional view of an alternate type of PCF having a different diameter, number of holes and hole spacing than the PCF of FIG. 1a.

DETAILED DESCRIPTION

Figures 1A, 1B:
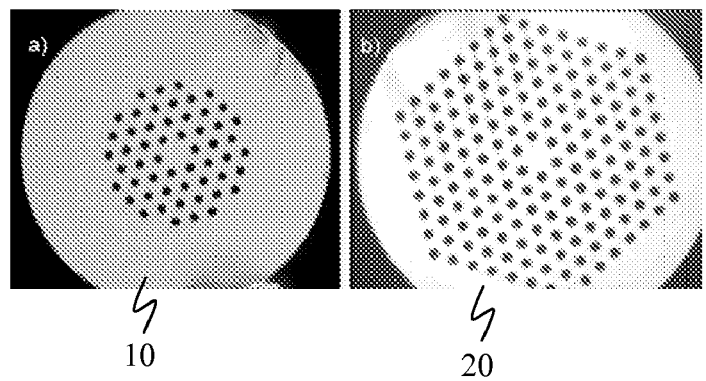
Figure 2:
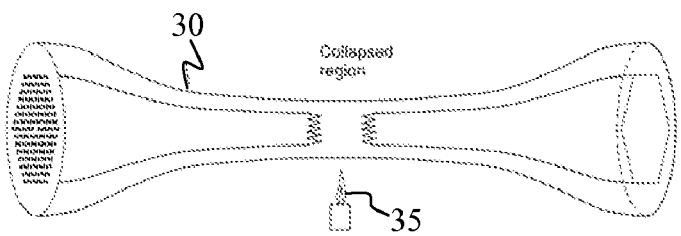
FIG. 2 is a view of a photonic crystal fiber shown being tapered and having a collapsed region.

Two types of PCF were studied: ESM-12-01 from Crystal-Fiber A/S (Blaze Photonics) and LMA-15 from Crystal-Fiber A/S, which are shown in FIGS. 1a and 1b respectively. Turning now to FIG. 1a, a photograph of a microscopic image of a cross-section of a first type of photonic crystal fiber 10 of the type ESM-12-01 is shown, from (Crystal-Fiber A/S) Blaze Photonics. In FIG. 1b a different PCF 20 geometry is shown in cross-section with the aid of a microscope. An attempt was made to write fiber Bragg gratings (FBSs) into both of these structures. FIG. 2 illustrates the tapering of LMA-15 PCF 20.

Bragg Grating Fabrication

The FBGs were made using 125 fs autocorrelated pulses of infrared radiation from a Ti:sapphire amplifier. The 800 nm radiation was focused using a 30 mm focal length cylindrical lens through a 3.21 µm period phase mask into the fiber taper, which was placed 5 mm away from the phase mask in order to interfere only the ±1 orders. The high-order period mask was selected so that induced grating pitch $\Lambda_g=1.6$ µm could be easily observed under the optical microscope. The beam radius was ~3.2 mm. The PCF was placed in a rotational jig in order to optimize the orientation of the cladding holes with respect to the incident writing beam to allow for maximum transmission. To extend the grating across the fiber cross-section, the focused beam was scanned in a direction parallel to the phase mask grooves across the fiber at a velocity of 10 µm/minute. The scanned exposures were made at 200 Hz repetition rate with up to 1200 µJ per pulse in the case of the EMS-12-01 fiber and 1100 µJ pulse energy for the tapered LMA-15 fiber respectively. Spectral measurements were obtained using a swept scanning tunable laser.

Tapered Fiber Fabrication

A fiber taper 30 was made using a fused biconic tapered coupler fabrication jig with a oxy-hydrogen flame 35 as shown schematically in FIG. 2. The LMA-15 fibers 20 were elongated in the flame by moving two translation stages in opposite directions and sweeping the flame along the fiber length. Pulling speeds varied from 0.03 to 0.1 mm/s. The taper 30 was viewed with an optical microscope to determine if the holes were collapsed. With no hole closure, no transmission loss was observed during taper fabrication that was above the resolution limit of the detection system (~0.05 dB). The taper waist length was ~12 mm with waist diameters varying between 30 to 55 µm.

Figure 3:
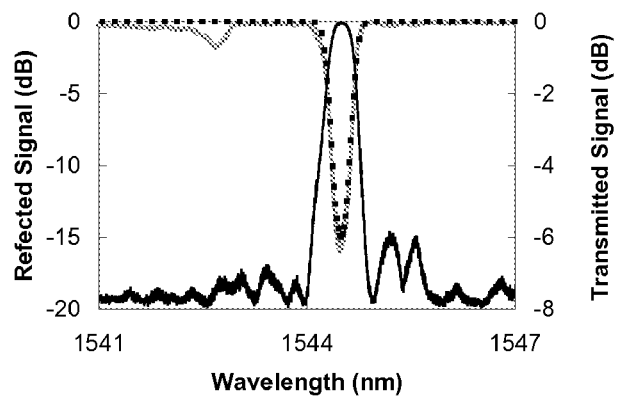
FIG. 3 is a graph of a transmission reflection spectrum vs wavelength for an ESM-12-01 PCF.

The transmission and reflection spectra of a grating written in the few-holed ESM-12-01 fiber 10 are shown in FIG. 3. For a given pulse energy, the grating strength would saturate after approximately a 5-minute exposure. The grating strength could be increased by incrementing the IR pulse energy rather than increasing the exposure time. Beyond 1200 µJ/pulse, damage to the fiber surface or interior holes resulted. Using FBG simulation software from Apollo Photonics, assuming a fundamental resonance and a Gaussian apodized beam profile of length L=6.4 mm (FWHM L=2.1 mm), the −6 dB transmission dip corresponds to a $\Delta n \approx 4 \times 10^{-4}$. From the Bragg relation $M\lambda_B = 2n_{eff}\Lambda_g$ where the order M=3, the effective index of the fiber $n_{eff}=1.442$ at the Bragg resonance $\lambda_B=1544.5$ nm. No $\Delta n$ dependence on the IR beam polarization was observed.

In the case of the LMA-15 fiber, neither adjustment of the fiber rotation to optimize the orientation of the microstructure with respect to the incident IR beam nor increasing pulse energy could overcome scattering of the writing beam without damaging the fiber. Several tapers were then fabricated. For the first taper, a slow pull speed of 0.03 mm/s resulted in a tapering of the fiber down to a 30 µm diameter taper waist with hole closure occurring over the entire 12 mm length of the taper waist. Optical microscope images of the collapsed region show that there was no scattering of the light by the cladding holes (see FIG. 4a).

Figures 4A, 4B, 4C:
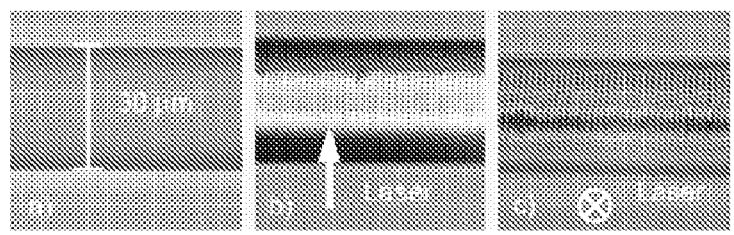
FIG. 4a is photograph of a microscope image of a tapered region of a PCF with collapsed holes, that is, no visible holes collapsed along entire 12 mm long 30 μm diameter taper waist.
FIG. 4b is a photograph of a microscope image of grating inscribed in hole collapsed region as viewed normal to irradiating IR beam.
FIG. 4c is a photograph of a microscope image of grating inscribed in hole collapsed region as viewed along irradiating IR beam axis.
Figure 5:
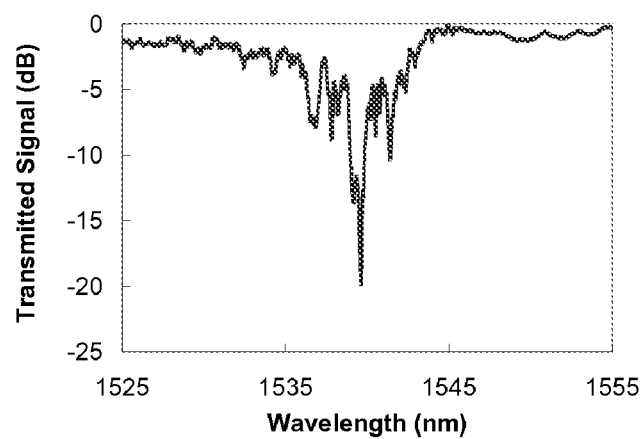
FIG. 5 is a graph of a transmission spectrum for grating written in 30 μm diameter LMA-15 fiber taper shown in FIGS. 4b and 4c.

With 1100 µJ/pulse and 200 Hz, the incident beam was swept once across the cross section of the fiber taper producing the multimode transmission spectrum shown in FIG. 5 after a 1 minute exposure. The strongest resonance is ~−20 dB. The grating inscribed in the tapered PCF was observed under the optical microscope normal to and along the laser beam optical axis (FIG. 4b and c respectively). From microscope observations, the length over which the holes collapsed was short (~100 µm) likely producing a tapering transition that was not adiabatic.

Figures 6A, 6B:
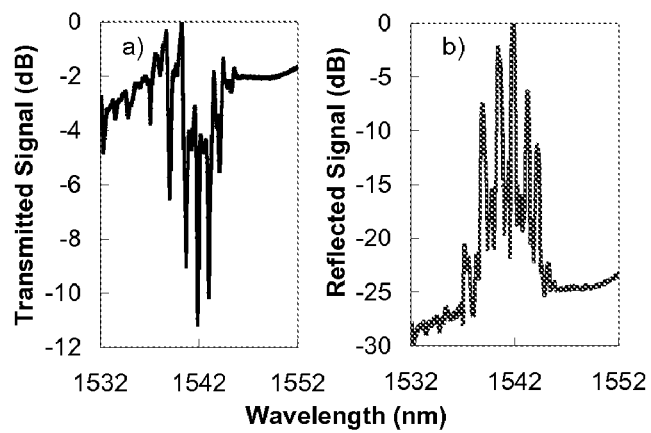
FIG. 6a and FIG. 6b show transmission and reflection spectra respectively of a grating in a 55-μm LMA-15 fiber taper.
Figure 6C:
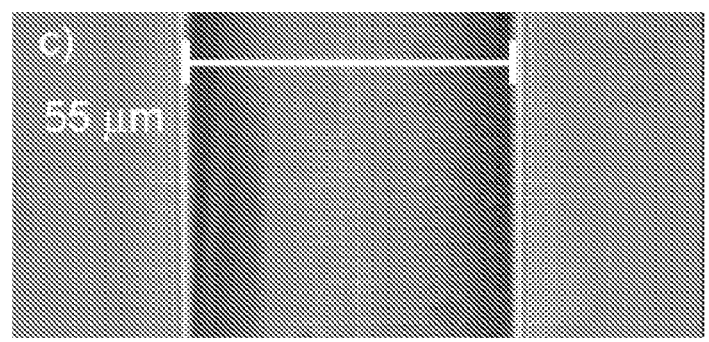
FIG. 6c is a photograph of a microscope image of the 1.6 μm period grating in the taper.

Another taper was fabricated with an increased pull speed of 0.1 mm/s that resulted in a 55 µm diameter taper but without closure of the cladding holes. The oxygen content in the flame was then increased to produce a hotter flame, resulting in a 10 mm length of collapsed holes. Using the same exposure conditions, a grating was inscribed after a 1 minute exposure in the collapsed-hole region producing a multimode reflection response as shown in FIG. 6. The strongest resonance is ~−9 dB in transmission. Both of the grating structures shown in FIG. 4 and 6 are highly multimode implying that strong mode coupling results from the collapse of the holes. A microscope image of the grating in the taper is shown in FIG. 6c.

Without collapsing of the holes, no transmission of the incident 800 nm radiation through the taper could be observed for diameters <40 µm. This may be due to the generation of a partial bandgap caused by the reduced hole spacing which is resonant with the incident radiation Another grating was written in a 48 µm diameter LMA-15 fiber taper such that the holes were not collapsed, but the bandgap was no longer incident with the 800 nm grating writing wavelength, allowing for a partial transmission through the taper. Assuming that the ratio of hole size and spacing remains constant for the taper, a 1-D simulation of the Fresnel reflections resulting from the 7 rows of holes shows that for a 48 µm taper, there is no reflection at 800 nm. With transmission loss before grating fabrication <0.05 dB, it is likely that the core mode was still guided. The fiber was exposed to 1000 µJ/pulse and 200 Hz for ~80 seconds, resulting in a quasi-single mode grating response (see FIG. 7). Using the same FBG modeling package and assumptions used for the grating in FIG. 3, the corresponding $\Delta n$ for the grating in FIG. 7 is $\sim 3 \times 10^{-4}$ with an $n_{eff}=1.423$ for $\lambda_B=1524.1$ nm.

Figure 7:
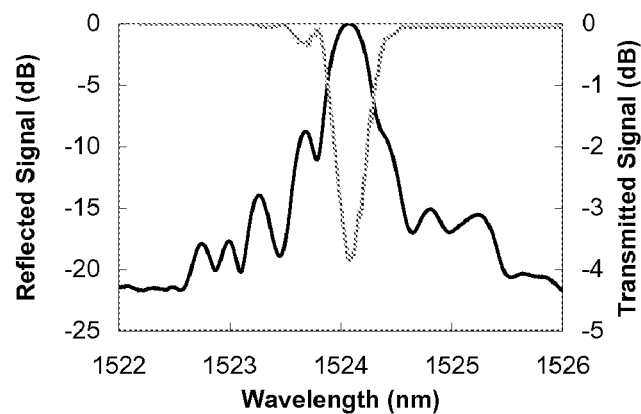
FIG. 7 is a graph of a transmission spectra transmission (gray) and reflection (black) spectra of a grating in 48 μm LMA-15 fiber taper without hole closure.
Figure 8:
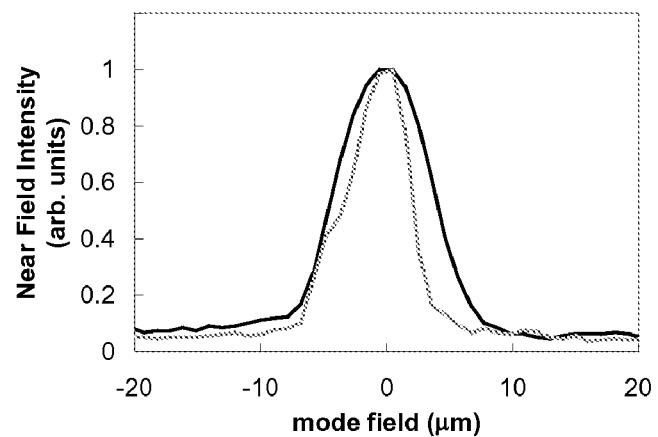
FIG. 8 is a graph of a mode-field profile of the mode exiting the SMF-28 fiver (black trace) and the 55-µm diameter LMA-15 PCF taper (gray trace).

In FIG. 7 considerable shifting of the Bragg resonance to shorter wavelength is observed. Near field images of the mode field diameter (MFD) of a 55 µm taper were obtained using an IR sensitive camera and a tunable laser source. Using the mode field measurement from a standard SMF-28 fiber as a reference (MFD=10.4 µm for SMF-28 at 1550 nm), the MFD of the $LP_{01}$ mode of the taper was 7.3 µm, slightly narrower than that of SMF-28 fiber (see FIG. 8). By tapering the fiber from 230 to 55 µm, the core was similarly reduced from 15 to 3.6 µm, therefore there is significant increase in mode overlap with the microstructured cladding region. The reduced confinement of the fundamental mode in the core region results in a greater contribution of the hole structures to the effective index, hence the shift of the Bragg resonance to shorter wavelengths.

Ideally one would prefer not to collapse the holes as the light propagating in the collapsed region becomes multi-mode. In the exit shoulder of the taper, light that is not in the fundamental mode becomes lost as the hole closure, at least in our case here, is not adiabatic. It would ultimately result in signal loss.

If loss due to the nonadiabaticity of the taper is not an issue, for example, for a particular sensor application, then collapsing holes definitely makes the grating inscription easier, i.e. like inscription in a glass rod.

It is possible to taper some photonic crystal fibers such as a "grape fruit" style PCF adiabatically with hole closure. In this instance, the grating inscription is easier. If the holes are not collapsed, the hole spacing can be adjusted by tapering so that the band gap is not resonant with the incident wavelength for a specific orientation of the holes with respect to the incident beam.

In an alternative embodiment of this invention, the holes or voids within the photonic crystal fiber can be filled at least in a predetermined region with a fluid such as a refractive index matching oil so as to allow IR light to propagate through the cladding into the core. As was described heretofore, IR light incident upon the PCF from the side, that would otherwise be suitable to write a grating the core of a standard single or multimode optical fiber will scatter due to refractive index difference between the air in the holes and the glass surrounding the holes. If the index difference is lessened or essentially nulled, the light external to the fiber directed to the side of the PCF focused on the core will reach the core with little or no scattering. Conveniently, by placing an end of the PCF in a beaker of index matching oil, due to surface tension the oil wicks into and permeates the openings of the PCF. As well, a vacuum could be applied to the other end of the PCF to create suction in order to draw in the fluid; see FIG. 4 in U.S. Pat. No. 7,062,140.

Numerous other embodiments may be envisaged without departing from the spirit and scope of this invention.

What is claimed is:

1. A method of changing the refractive index in a region of the core of a photonic crystal waveguide comprising the steps of:
   a) providing a photonic crystal waveguide having a core and having a cladding with holes therein;
   b) changing the response of the cladding to light, so as to lessen unwanted scattering in the cladding; and,
   c) irradiating the photonic crystal waveguide from a side with laser light having an intensity and duration so as to effect a permanent refractive index change within the region of the core of the photonic crystal waveguide of at least $1 \times 10^{-5}$.

2. A method of changing the refractive index in a region of the core of a photonic crystal waveguide comprising the steps of:
   a) providing a photonic crystal waveguide having a core and having a cladding with holes therein;
   b) changing the response of the cladding to light, so as to lessen unwanted scattering in the cladding; and,
   c) irradiating the photonic crystal waveguide from a side with laser light having an intensity and duration so as to effect a permanent refractive index change within the region of the core of the photonic crystal waveguide of at least $1 \times 10^{-5}$, wherein the photonic crystal waveguide is a PCF, and wherein step (b) comprises the step of tapering the PCF to form a tapered region, and wherein step (c) comprises the step of irradiating the tapered region.

3. A method as defined in claim 2 wherein the step of tapering the PCF includes tapering so as to at least partially deform the holes within the PCF.

4. A method as defined in claim 2 wherein the step of tapering includes tapering so as to collapse the holes within the PCF.

5. A method as defined in claim 4 wherein the laser light is pulsed.

6. A method as defined in claim 5 wherein the pulses of laser light are of femtosecond pulse durations.

7. A method as defined in claim 5 wherein the pulses of light are pulses in the infrared band of wavelengths.

8. A method of changing the refractive index in a region of the core of a photonic crystal waveguide comprising the steps of:
   a) providing a photonic crystal waveguide having a core and having a cladding with holes threin;
   b) changing the response of the cladding to light, so as to lessen unwanted scattering in the cladding; and,
   c) irradiating the photonic crystal waveguide from a side with laser light having an intensity and duration so as to effect a permanent refractive index change within the region of the core of the photonic crystal waveguide of at least $1 \times 10^{-5}$, wherein the photonic crystal waveguide is a PCF and wherein the PCF is tapered to an extent that allows some light to propagate through the cladding that would otherwise have scattered in the absence of tapering.

9. A method as defined in claim 8, wherein the PCF is tapered so that a waist region results that is sufficiently narrow so as to allow at least 10% of light propagating from a side directed to the core, to reach the core.

10. A method as defined in claim 8, wherein the PCF is tapered sufficiently so as to mismatch the hole size and spacing with an irradiating wavelength so as to allow at least 10% of light propagating from a side directed to the core, to reach the core.

11. A method of inducing a spatially modulated refractive index pattern in a photonic crystal optical fiber, comprising the steps of:
   providing the photonic crystal optical fiber;
   tapering the photonic crystal optical fiber adiabatically such that the photonic crystal optical fiber propagates in single mode electromagnetic radiation having a predetermined wavelength range and
   collapsing the holes in the tapered region of said photonic crystal optical fiber such that light propagating along the collapsed region fills the collapsed region cross-section;
   wherein the collapsed region is transmissive to electromagnetic radiation having a predetermined wavelength range;
   disposing a mask to be used as an interferometer, adjacent the photonic crystal optical fiber such that light incident upon the mask is transmitted directly into said optical fiber; and,
   providing electromagnetic radiation on a surface of the mask, the electromagnetic radiation having a predetermined wavelength range and having a pulse duration of less than or equal to 500 picoseconds, wherein the mask is disposed to permit a portion of the electromagnetic radiation to interact with the mask and be incident on the photonic crystal optical fiber, the interaction of the electromagnetic radiation with the mask for producing a spatial intensity modulation pattern within the photonic crystal optical fiber, the electromagnetic radiation incident on the photonic crystal optical fiber or waveguide being sufficiently intense to cause a change in an index of refraction of the photonic crystal optical fiber , wherein electromagnetic radiation interacting with the surface of the mask having a sufficiently low intensity to not significantly alter produced spatial intensity modulation properties of the mask.

12. A method of changing the refractive index in a region of the core of a photonic crystal waveguide comprising the steps of:

a) providing a photonic crystal waveguide having a core and having a cladding with holes therein;

b) changing the response of the cladding to light, so as to lessen unwanted scattering in the cladding; and, c) irradiating the photonic crystal waveguide from a side with laser light having an intensity and duration so as to effect a permanent refractive index change within the region of the core of the photonic crystal waveguide of at least $1 \times 10^{-5}$, wherein step (b) comprises the step of introducing a refractive index matching fluid into the cladding of the photonic crystal waveguide in at least the region of the cladding to be irradiated, and wherein step (b) is preformed before step (c).

13. A method as defined in claim 12, wherein the index matching fluid is introduced via the holes and wherein the refractive index matching fluid is more closely matched in refractive index to the photonic crystal waveguide material, than to air.

* * * * *